United States Patent
Nam

(10) Patent No.: US 9,860,721 B2
(45) Date of Patent: Jan. 2, 2018

(54) INTELLIGENT EMERGENCY SIGNAL TRANSMISSION SYSTEM USING MOBILE PHONE AND METHOD THEREOF

(75) Inventor: Ki-Won Nam, Seoul (KR)

(73) Assignee: TW MOBILE CO., LTD., Seoul (KR)

( * ) Notice: Subject to any disclaimer, the term of this patent is extended or adjusted under 35 U.S.C. 154(b) by 1125 days.

(21) Appl. No.: 13/574,927

(22) PCT Filed: Jan. 25, 2011

(86) PCT No.: PCT/KR2011/000519
§ 371 (c)(1),
(2), (4) Date: Jul. 24, 2012

(87) PCT Pub. No.: WO2011/090360
PCT Pub. Date: Jul. 28, 2011

(65) Prior Publication Data
US 2012/0295575 A1    Nov. 22, 2012

(30) Foreign Application Priority Data
Jan. 25, 2010 (KR) .................. 10-2010-0006303

(51) Int. Cl.
*H04W 4/22* (2009.01)
*G08B 25/01* (2006.01)
(Continued)

(52) U.S. Cl.
CPC ............ *H04W 4/22* (2013.01); *G08B 25/016* (2013.01); *G08B 25/08* (2013.01); *H04M 11/04* (2013.01); *H04W 76/007* (2013.01)

(58) Field of Classification Search
CPC .............................. H04W 4/22; H04W 76/007
(Continued)

(56) References Cited

U.S. PATENT DOCUMENTS

| | | | | |
|---|---|---|---|---|
| 6,175,329 B1* | 1/2001 | Vicci | .................... | G08B 21/043 342/357.4 |
| 7,076,235 B2* | 7/2006 | Esque | .................... | H04M 3/42 455/404.1 |

(Continued)

FOREIGN PATENT DOCUMENTS

| JP | 2002-271450 A | 9/2002 |
|---|---|---|
| KR | 10-2006-0105312 A | 10/2006 |
| KR | 10-2009-0132869 A | 12/2009 |

*Primary Examiner* — Omoniyi Obayanju
(74) *Attorney, Agent, or Firm* — Novick, Kim & Lee, PLLC; Jae Youn Kim

(57) ABSTRACT

An intelligent emergency signal transmission system using a mobile phone and a method thereof are disclosed. According to the intelligent emergency signal transmission system using a mobile phone and the method thereof, even though the user does not separately perform a key operation, the information indicating that the user is in the emergency situation can be transmitted to the mobile phone of the third party by determining whether a pre-registered voice is input. In addition, a call connection with mobile phones to a plurality of third parties registered with the mobile phone of the user can be automatically performed to transmit the emergency signals. Therefore, the third parties can rapidly recognize the emergency situation of the user. In addition, the help request signal can be rapidly transmitted to the third party positioned near the user who is in the emergency situation so that the emergency situation can be effectively overcome.

3 Claims, 11 Drawing Sheets

(51) Int. Cl.
*G08B 25/08* (2006.01)
*H04M 11/04* (2006.01)
*H04W 76/00* (2009.01)

(58) Field of Classification Search
USPC .................................................... 455/404.1
See application file for complete search history.

(56) References Cited

U.S. PATENT DOCUMENTS

| | | | | |
|---|---|---|---|---|
| 2006/0200304 | A1* | 9/2006 | Oh | G01C 21/3644 |
| | | | | 701/426 |
| 2008/0132199 | A1* | 6/2008 | Hirata | G08B 25/001 |
| | | | | 455/404.2 |
| 2008/0284587 | A1* | 11/2008 | Saigh | H04M 1/72541 |
| | | | | 340/539.13 |
| 2010/0020978 | A1* | 1/2010 | Garudadri | H04R 5/04 |
| | | | | 381/57 |

* cited by examiner

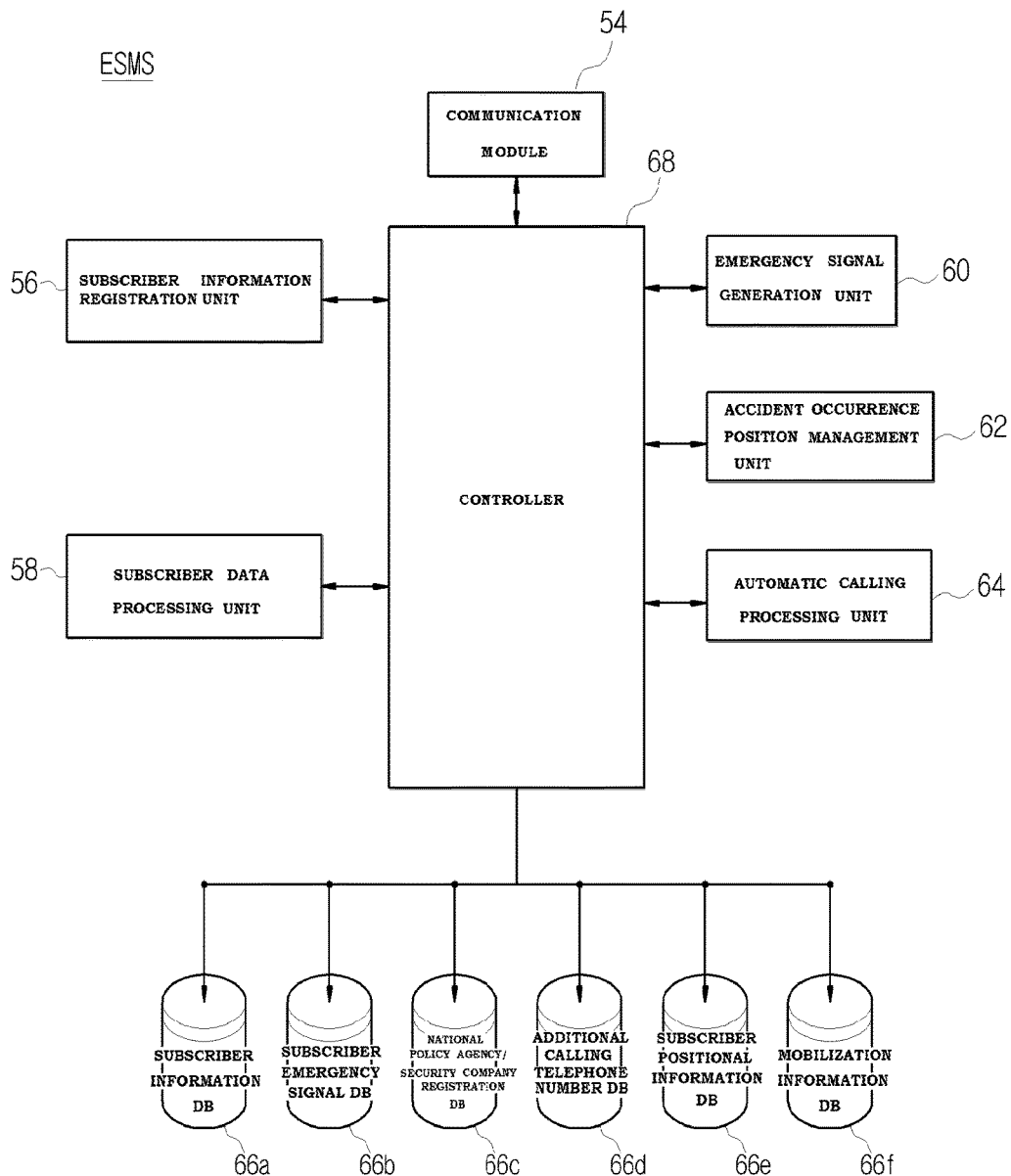

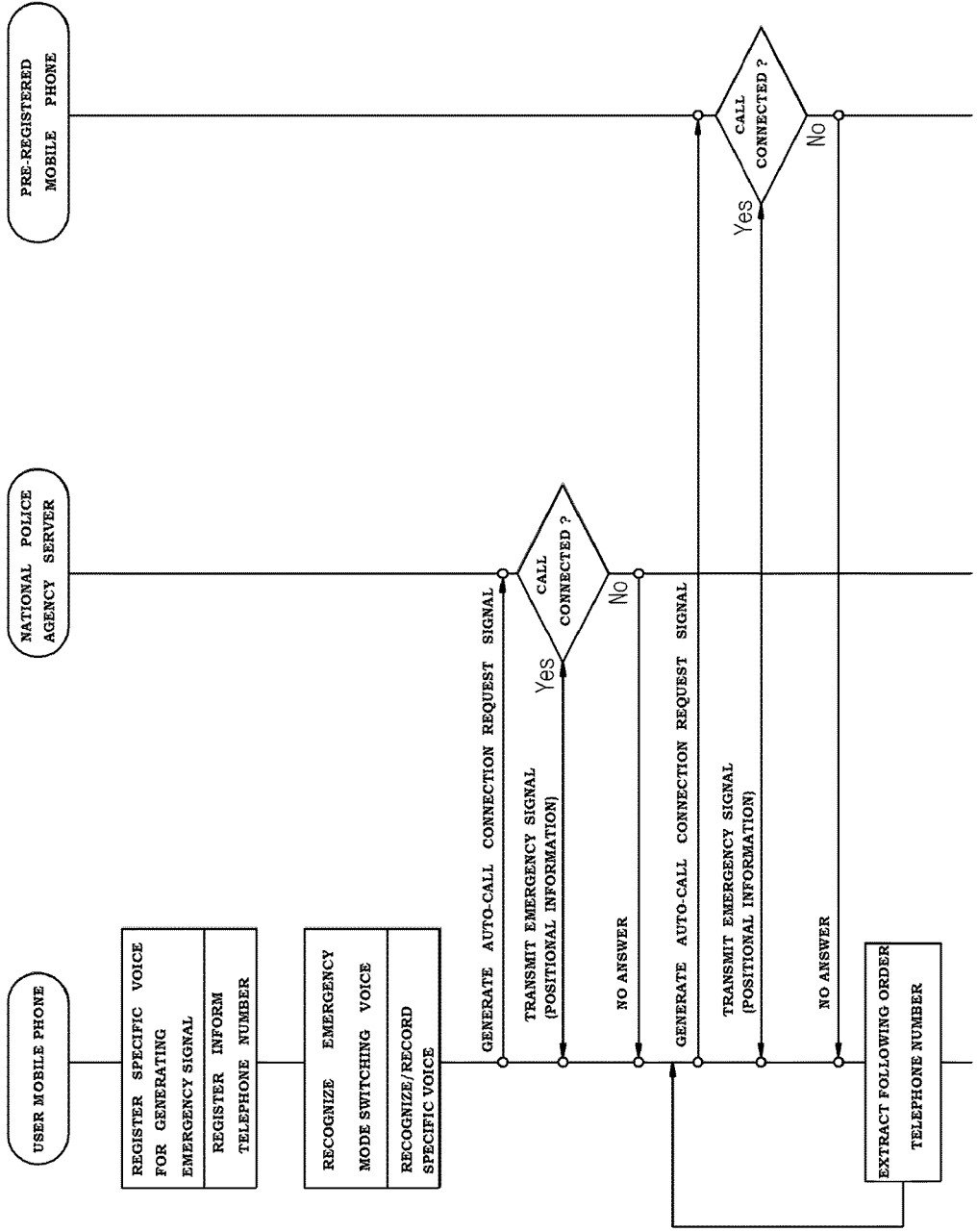

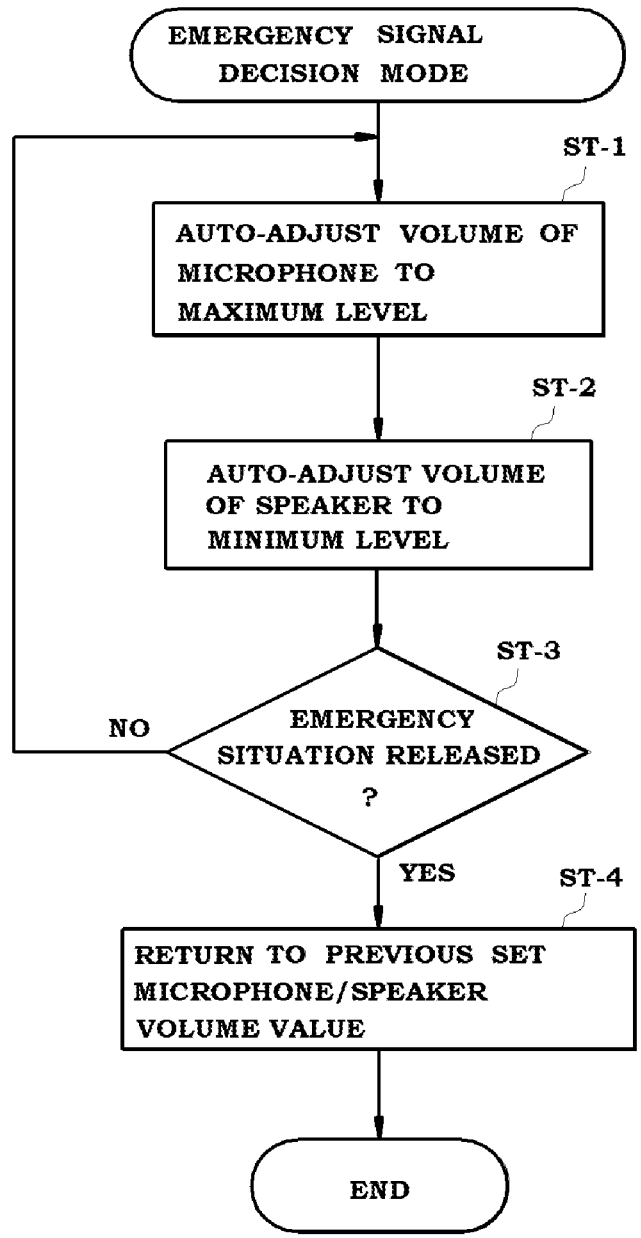

INTELLIGENT EMERGENCY SIGNAL TRANSMISSION SYSTEM USING MOBILE PHONE AND METHOD THEREOF

BACKGROUND OF THE INVENTION

1. Field of the Invention

The present invention relates to an intelligent emergency signal transmission system using a mobile phone and a method thereof, and more particularly, to an intelligent emergency signal transmission system using a mobile phone capable of automatically transmitting emergency situation information and corresponding positional information to a specific mobile phone by allowing a user to register a specific voice with a mobile phone of the user having a voice recognition function and allowing the mobile phone to recognize the registered voice at the time of the occurrence of the emergency situation while recording the corresponding voice to perform a call connection to mobile phones in a plurality of called parties until the recorded voice is transmitted to the mobile phones in the plurality of called parties, and a method thereof.

2. Description of the Related Art

As is generally known, recently, with development of information and communication technologies, information providing technologies have been actively developed which provide, in real-time, information for various fields to a plurality of subscribers through at least one or more servers over a remote data communication network.

Based on this development, recently, a peripheral technology such as a cash memory extension technology for providing accurate information to the subscriber in a more rapid way, and information selection technology and a compression technology capable of accessing information according to a taste and preference of the subscriber in a more convenient way have been developed. In addition, the development of various contents and solutions thereof have also been conducted in accordance with above technologies.

Particularly, at the current time in which a capitalistic society has become highly developed and the accumulation of wealth for private property has become a very large personal concern, a protective service for the body of the individual and family is appropriately required.

In practice, the gap between the rich and the poor has deepened and the unemployment rate has increased, so the various violent crime rates have also increased and kidnapping, robbery and assault cases have rapidly increased.

Therefore, in the case of the occurrence of the robbery and kidnapping cases, a portable high voltage device or the like capable of suppressing the opposite party has come onto the market. However, when the user suppresses the opposite party using the portable high voltage device, significant bravery and quickness are required. Since the high voltage device is generally carried in a state in which the high voltage device is put into a handbag or the like, it is very difficult for the user to take out an article which is put into the handbag in a situation which involves a deadly weapon such as a knife.

In addition, the robbery, assault and kidnapping cases frequently happen to the elderly, babies, or women who are physically weak, and as such it is very difficult for the weak user to suppress the opposite party.

Further, in the case of failing in suppressing the opposite party in the robbery, assault and kidnapping cases, it causes the emotions of the opposite party to be stimulated, thereby having an adverse effect.

Therefore, recently, a security phone has appeared in which a GPS function is embedded and a remote server such as a server of a national police agency or a server of a security company is automatically informed of its owner's position and own emergency situation by operating a button. However, even in the case of the security phone, a mobile phone has to be directly operated. Therefore, in the situation which involves a deadly weapon such as a knife, it is difficult to operate a hot key of the mobile phone to transmit specific information.

In addition, a conventional security phone transmits the emergency situation to the server of the national police agency or the server of a security company. That is, if the emergency situation is transmitted to any one of the server of the national police agency and a server of a security company or a terminal, when communication is impossible or data transmission is impossible, for example, when a call connection is not performed, the emergency signal may not be transmitted.

In addition, in case in which there is a call connection with a telephone of the national police agency or a conventional telephone of a security company is performed by the operation of the hot key of the security phone, since the voice of a person in charge of the national police agency or a person in charge of the security company who is a called party is directly output through a speaker of the security phone, the robber or the kidnapper may also hear the corresponding voice.

Meanwhile, in a situation in which the call connection with the telephone of the national police agency or the conventional telephone of a security company is performed by the operation of the hot key of the security phone, when a volume of a microphone of the security phone has been adjusted to a lower level, the emergency voice data of a scene may not be properly transmitted to the called party.

Also, all mobile terminals including a conventional security phone may determine position data using a triangulation operation based on three base stations or determine positional information by receiving coordinate information from a GPS satellite in order to find the position where the emergency situation has occurred. An operation scheme based on the base stations may generate an error of hundreds of meters, and the method for finding the position using the GPS method may obtain a more accurate position than the position using the base stations, but in a position such as a building interior, a vehicle, or a subway, since the coordinate value may not be received from the GPS satellite, the position may not be determined.

Meanwhile, even though the emergency situation is informed to the telephone of the national police agency or a security company by the operation of the hot key of a conventional security phone, in a case in which mobilization personnel are far away from the scene, the danger in which an accident occurs is very high before the mobilization personnel arrives at the scene.

SUMMARY OF THE INVENTION

In consideration of the above mentioned problems, it is an object of the present invention to provide an intelligent emergency signal transmission system using a mobile phone capable of automatically transmitting emergency situation information and corresponding positional information to a specific mobile phone by allowing a user to register a specific voice with a mobile phone of the user having a voice recognition function and allowing the mobile phone to recognize the registered voice at the time of the occurrence of the emergency situation while recording the corresponding voice to perform a call connection to mobile phones in a plurality of called parties until the recorded voice is transmitted to the mobile phones in the plurality of called parties, and a method thereof.

Another object of the present invention is to provide an intelligent emergency signal transmission system using a mobile phone capable of effectively inputting a scene sound by causing the mobile phone of a user having a voice recognition function to auto-adjust a volume of a microphone to a maximum level and to auto-adjust the volume of a speaker to a minimum level in order to correspond to an emergency situation when the system determines there is an emergency situation such that a kidnapper, a robber or the like does not notice the volume output from the speaker, and a method thereof.

Yet another object of the present invention is to provide an intelligent emergency signal transmission system using a mobile phone capable of extracting accurate positional information by synthetically utilizing coordinate values of GPS satellites, position of base stations, moving path information designated by a user, and current positional information designated by the user to overcome each defect of the above elements in determining the position of the mobile phone capable of automatically transmitting the emergency signal, and a method thereof.

Still another object of the present invention is to provide an intelligent emergency signal transmission system using a mobile phone capable of transmitting the positional information of an emergency signal generation to a mobile phone of a third party positioned within a certain radius based on a position of the mobile phone at which the emergency signal has occurred and a help request signal to rapidly receive help from persons near the user, and a method thereof.

TECHNICAL SOLUTION

In order to accomplish the foregoing objects, according to an embodiment of the present invention, there is provided an intelligent emergency signal transmission system using a mobile, including: a mobile phone of a user for loading voice recognition software determining whether an emergency situation has occurred through a voice recognition for a preset specific voice data, and sequentially attempting a call connection to a plurality of telephone numbers which are pre-registered through a voice communication network when it is determined that the emergency situation has occurred, and transmitting data containing an emergency situation alert signal when the call connection is performed; a national police agency server or a security company server receiving the emergency situation alert signal from the mobile phone of the user to generate a scene mobilization signal; and a mobile phone having the pre-registered telephone numbers for receiving the emergency situation alert signal from the mobile phone of the user.

Preferably, the mobile phone of the user stores position and voice matching data for converting the positional information including coordinate values into place information, and converting the place information into a voice signal to transmit the positional information through the voice communication network.

According to another embodiment of the present invention, there is provided an intelligent emergency signal transmission method using a mobile phone, including: receiving and setting, by a mobile phone of a user which determines positional information and is provided with voice recognition software, voice data for generating an emergency situation signal; sequentially registering a plurality of telephone numbers to be automatically called with the mobile phone of the user; receiving, by the mobile phone of the user, surrounding voice data; comparing, by the user, pre-registered voice data for generating the emergency situation signal with a voice data input in real time by driving the voice recognition software loaded therein to determine whether both voice data are matched; determining, by the mobile phone of the user, a current position when both voice data are matched and configuring a voice packet together with an emergency situation occurrence signal; attempting a call connection in the order of pre-registered telephone numbers; and transmitting the emergency situation signal to pre-registered mobile phones when the call connection is performed.

According to yet another embodiment of the present invention, there is provided an intelligent emergency signal transmission method using a mobile, including: receiving and setting, by a mobile phone of a user which determines positional information and is provided with voice recognition software, voice data for generating an emergency situation signal; generating a service subscription signal from the mobile phone of the user to an emergency signal management server to transmit individual personal information and telephone information to the emergency signal management server; transmitting, by the emergency signal management server, a URL value of a corresponding server to the mobile phone of the user to register an automatic connection function; switching the mobile phone of the user to an emergency situation decision mode; activating a microphone of the mobile phone of the user to receive a voice data from a point of time when switching to the emergency situation decision mode; comparing, by the mobile phone of the user, the pre-registered voice data for generating the emergency situation signal with a voice data input in real time by the user by driving a voice recognition software loaded therein when the voice data is input to determine whether both voice data are matched; determining a current position by the mobile phone of the user when both voice data are matched and configuring a data packet by combining an emergency situation occurrence signal and the current position; automatically activating, by the mobile phone of the user, a wireless internet network to transmit the emergency situation occurrence signal and the positional information to the emergency signal management server of a pre-registered URL; receiving, by the emergency signal management server, the emergency situation occurrence signal and the positional information to transmit corresponding user information, the emergency situation occurrence signal and the positional information to a national police agency server or a security company server through a data communication network; generating, by the emergency signal management server, a call connection signal in the registered order when telephone numbers of specific mobile phone in which the user registers in advance are present in the emergency signal management server; and transmitting the corresponding user information, the emergency situation occurrence signal and the positional information to the mobile phone in which the call connection is performed.

According to still another embodiment of the present invention, there is provided an intelligent emergency signal transmission system using a mobile, including: a mobile phone of a user for loading voice recognition software determining whether an emergency situation has occurred through a voice recognition for a preset specific voice data, and sequentially attempting a call connection to a plurality of telephone numbers which are pre-registered through a voice communication network when it is determined that the emergency situation has occurred, and transmitting data containing an emergency situation alert signal when the call connection is performed; an emergency signal management server for receiving the emergency situation alert signal from the mobile phone of the user to transmit a telephone number of the mobile phone of the user to a mobile communication server through a data communication network in the state that a plurality of user information and telephone information pre-registered by corresponding user are registered, and receiving telephone number information of a plurality of mobile phones positioned in a base station region in which the mobile phone of the user is included from the mobile communication server to transmit information of the user in the emergency situation and the emergency situation alert signal; and a mobile communication server for receiving information of the mobile phone of the user in which the emergency situation signal is generated from the emergency signal management server, and searching for the telephone numbers of the plurality of mobile phones positioned within a certain radius centered around the mobile phone of the user to transmit the searched telephone number to the emergency signal management server, wherein the plurality of mobile phones have the pre-registered telephone numbers for receiving the emergency situation alert signal from the mobile phone of the user.

According to yet still another embodiment of the present invention, there is provided an intelligent emergency signal transmission method using a mobile, including: receiving, by an emergency signal management server, an emergency signal from a mobile phone of a user; transmitting positional information of an emergency signal generation to a mobile communication server; extracting, by the mobile communication server, telephone numbers of the mobile phones within a certain radius based on corresponding position; transmitting the telephone numbers of the mobile phones positioned near the mobile phone of the user to an emergency signal management server; and transmitting, by the emergency signal management server, the positional information in which the emergency situation has occurred, an emergency signal, and a help request signal to the telephone numbers of the mobile phones positioned near the mobile phone of the user.

Preferably, the extracting of the telephone numbers of the mobile phones searches for a presence and telephone numbers of the mobile phones positioned near the mobile phone of the user through the positional information of the mobile phones received from a plurality of base stations.

According to the intelligent emergency signal transmission system using a mobile phone and a method thereof, even though the user does not separately perform a key operation, the information indicating that the user is in the emergency situation can be transmitted to the mobile phone of the third party by determining whether a pre-registered voice is input. In addition, a call connection with mobile phones to a plurality of third parties registered with the mobile phone of the user can be automatically performed to transmit the emergency signals. Therefore, the third parties can rapidly recognize the emergency situation of the user. In addition, the volume of the speaker and microphone of the mobile phone of the user can be auto-adjusted to correspond to the scene situation, and the position of the user can be more accurately calculated using a plurality of schemes among the GPS scheme, the positional information calculation scheme using base stations, a registration of the moving path, and a registration of the current position, and thereby making it possible to go to the scene. In addition, the help request signal can be rapidly transmitted to the third party positioned near the user who is in the emergency situation so that the emergency situation can be effectively overcome.

BRIEF DESCRIPTION OF THE DRAWINGS

The above objects, features and advantages of the present invention will become more apparent to those skilled in the related art in conjunction with the accompanying drawings. In the drawings:

FIG. 4 is a block diagram showing a configuration of an emergency signal management server included in the intelligent emergency signal transmission system using the mobile phone according to the first embodiment of the present invention;

FIGS. 5A, 5B and 5C are flowcharts showing a signal flow of the intelligent emergency signal transmission system using the mobile phone according to the first embodiment of the present invention;

DETAILED DESCRIPTION OF THE INVENTION

Hereinafter, an intelligent emergency signal transmission system using a mobile phone according to a first embodiment of the present invention will be described in detail with reference to accompanying drawings.

Figure 1:
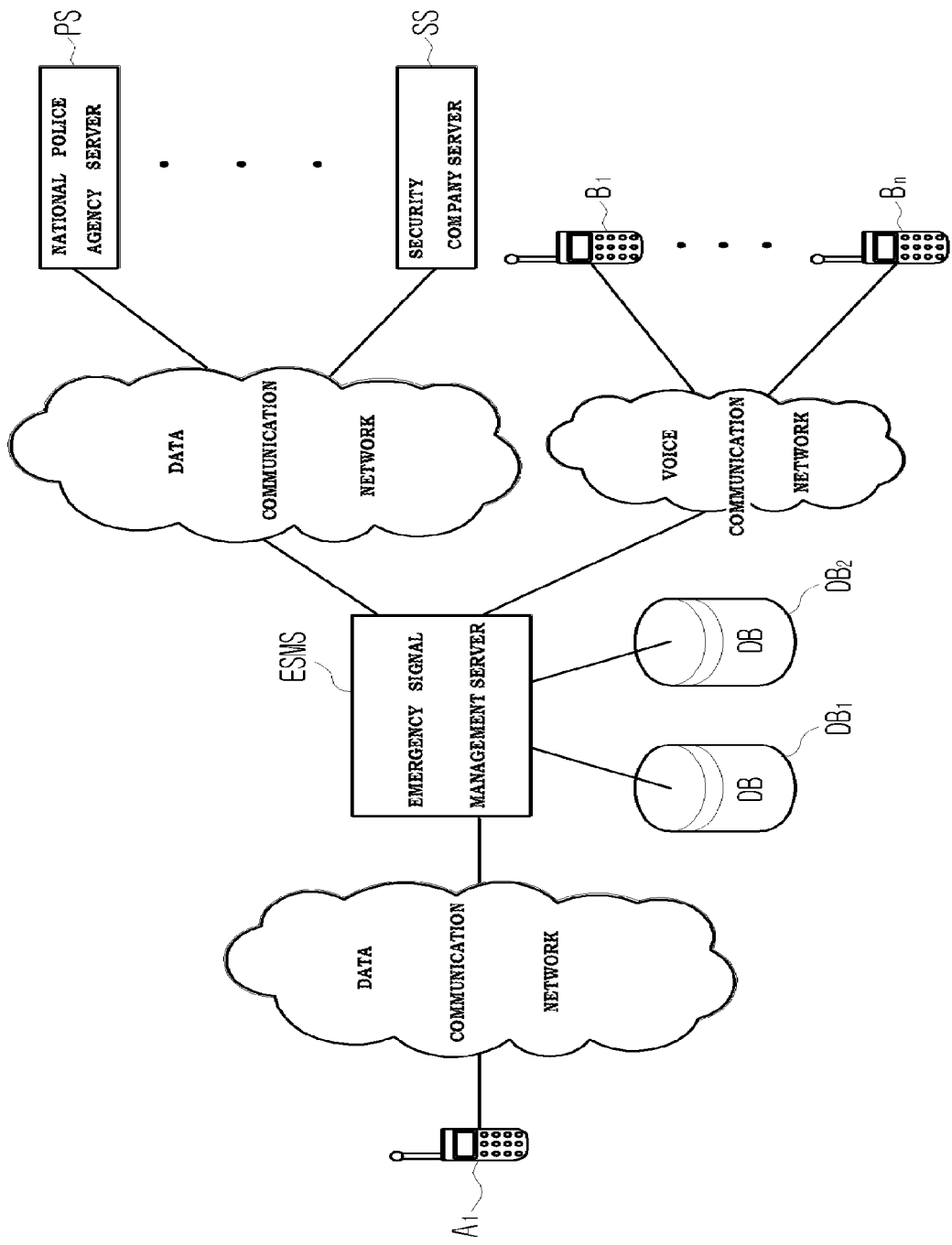
FIG. 1 is a view schematically showing a configuration of an intelligent emergency signal transmission system using a mobile phone according to a first embodiment of the present invention.

FIG. 1 is a view schematically showing a configuration of an intelligent emergency signal transmission system using a mobile phone according to a first embodiment of the present invention.

Referring to FIG. 1, the intelligent emergency signal transmission system using the mobile phone according to the first embodiment of the present invention is a system capable of automatically transmitting emergency situation information and corresponding positional information to a specific mobile phone by allowing a user to register a specific voice with a mobile phone of the user having a voice recognition function and allowing the mobile phone to recognize the registered voice at the time of the occurrence of the emergency situation while recording the corresponding voice to perform a call connection to mobile phones in a plurality of called parties until the recorded voice is transmitted to the mobile phones in the plurality of called parties.

In addition, the present invention provides a system capable of effectively inputting a scene sound by causing the mobile phone of a user having a voice recognition function to auto-adjust a volume of a microphone to a maximum level and to auto-adjust the volume of a speaker to a minimum level in order to correspond to an emergency situation when the system has determined an emergency situation such that a kidnapper, a robber or the like does not notice the volume output from the speaker That is, the intelligent emergency signal transmission system using the mobile phone according to the first embodiment of the present invention is a system for requesting a mobilization or help by automatically transmitting a signal indicating that an emergency situation has occurred to the mobile phone of specific called party in a case in which a user is in an emergency situation such as a robbery, a kidnapping or other dangerous situation.

To this end, the intelligent emergency signal transmission system using the mobile phone according to the first embodiment of the present invention largely suggests two schemes as the scheme transmitting the emergency situation occurrence signal as below.

The first scheme is a scheme for transmitting the emergency signal and the positional information from the mobile phone A1 of the user to a mobile phone (not shown) provided in a police server PS or mobile phones B1-Bn having specific phone numbers through a voice communication network, and the second scheme is a scheme for transmitting the emergency signal and the positional information from the mobile phone A1 of the user to an emergency signal management server (ESMS) through a data communication network, and then transmitting the emergency signal and the positional information from the emergency signal management server (ESMS) to a called party terminal registered by a corresponding user in advance.

Both schemes are merely means for transmitting the emergency signal. Therefore, the intelligent emergency signal transmission system using the mobile phone according to the first embodiment of the present invention may use any one of both schemes. Hereinafter, the configurations for both schemes will be sequentially described.

The intelligent emergency signal transmission system using the mobile phone according to the first embodiment of the present invention includes the mobile phone A1 of the user for transmitting the emergency signal. The mobile phone A1 of the user is provided with voice recognition software capable of determining whether an emergency situation has occurred through the voice recognition for a preset specific voice data. In addition, the mobile phone of the user sequentially attempts a call connection to a mobile phone having a plurality of telephone numbers which are pre-registered while determining whether the call connection between an emergency situation alert signal and the mobile phone having the plurality of telephone numbers which are pre-registered is performed through a voice communication network when it is determined that the emergency situation has occurred, and transmits the combined signal to the mobile phone having the current positional information and the matched voice information when the call connection is performed.

In addition, the intelligent emergency signal transmission system using the mobile phone according to the first embodiment of the present invention includes a national police agency server PS or a security company server SS receiving the emergency situation alert signal from the mobile phone A1 of the user and generating a scene mobilization signal.

Here, the emergency situation alert signal from the mobile phone A1 of the user to the national police agency server PS or the security company server SS may be transmitted through the voice communication network. Therefore, the mobile phone A1 of the user is configured to attempt the call connection to the national police agency server PS or the security company server SS to transmit the emergency situation alert signal in a state in which the call is connected thereto.

Therefore, the mobile phone A1 of the user is registered with the phone numbers of a landline telephone or a mobile phone added to the national police agency server PS or a security company server SS in advance. Therefore, a "telephone terminal" is more suitable than "the national police agency server PS or a security company server SS". However, it is noticed that the terms "the national police agency server" PS or "the security company server SS" are given to describe a configuration of the system for transmitting the emergency situation alert signal through a wireless internet network.

Meanwhile, the intelligent emergency signal transmission system using the mobile phone according to the first embodiment of the present invention includes mobile phones B1-Bn having pre-registered telephone numbers for receiving the emergency situation alert signal from the mobile phone A1 of the user. If the mobile phones B1-Bn having pre-registered telephone numbers are mobile phones of a person in charge of the national police agency or a security company, the national police agency server PS or the security company server SS may be omitted in the present embodiment.

Therefore, the intelligent emergency signal transmission system using the mobile phone according to the first embodiment of the present invention determines whether an emergency situation has occurred by automatically comparing a voice input of the user with a pre-stored specific voice data using the mobile phone A1 of the user. Here, when the system has determined that the emergency situation has occurred, the call connection signal is automatically sent to the pre-registered mobile phones B1-Bn. Then, when the call connection is performed, the emergency situation alert signal is transmitted.

The mobile phone A1 of the user performs the call connection to the mobile phones B1-Bn having pre-registered telephone numbers. However, when the call connection has not been performed, the call connection to another telephone number registered in the following order is attempted. Thereafter, when the call connection has been performed, an emergency situation alert signal is transmitted.

At this time, the emergency situation alert signal transmitted from the mobile phone A1 of the user includes the emergency voice signal and positional information. Therefore, the emergency voice signal becomes recorded voice data for the accident occurrence scene in the case in which an emergency situation is determined through the mobile phone A1 of the user.

That is, in a state in which the user registers specific voice data such as "spare me, please" or "why are you doing this?" as the voice data for generating the emergency situation with the mobile phone A1 of the user, when the specific voice data is input, the mobile phone A1 of the user determines that the emergency situation has occurred, and records the voice data of the scene for a certain time to create a voice signal. Next, the current position data and the matched voice signal (for example, the generation position of the emergency signal is adjacent to Gangnam Station's Exit 2 in Seoul) are combined, and the combined data is transmitted to the pre-registered landline telephone or the mobile phones B1-Bn. Therefore, the third party can recognize the emergency situation of the user.

Particularly, in the case of a baby, person whose behavior is not good, or elderly person having dementia, since the positional information of the user is rapidly informed to a guardian, the guardian may rapidly take follow-up measures.

The mobile phone A1 included in the intelligent emergency signal transmission system using the mobile phone according to the first embodiment of the present invention includes the voice recognition software. Since the voice recognition software includes a typical viterbi search algorithm or a word or grammar dictionary as already known software, the voice recognition software executes the voice recognition for the input voice. However, the voice recognition software in the present invention is voice recognition software which compares and analyzes a voice pattern which the user has directly pre-input as the speaking party, such that the voice recognition software in the present invention is simpler than standard voice recognition software. That is, accurate recognition for all voices is not required, and it is sufficient to compare the voice pattern of the pre-input specific word with the input voice pattern to determine only whether both voice patterns match. Since the voice recognition software itself is outside the scope of the present invention, a detailed description thereof will be omitted.

In addition, since the mobile phone A1 of the user stores position and voice matching data for converting positional information including a coordinate value into a place information, and converts the place information into a voice signal, the mobile phone A1 is configured to be able to transmit positional information through the voice communication network.

In addition, the mobile phone A1 included in the intelligent emergency signal transmission system using the mobile phone according to the first embodiment of the present invention has imbedded therein a local area wireless communication module for communicating with a microphone device, and further comprises a volume adjustment unit for adjusting the volume of the speaker to a minimum level and adjusting the volume of the microphone to a maximum level within the microphone device. The configuration thereof will be described below.

Another scheme of the intelligent emergency signal transmission system using the mobile phone according to the first embodiment of the present invention is to transmit the emergency situation alert signal to the national police agency server PS or a security company server SS through a wireless internet network, that is, wireless data communication network. The configuration thereof will be also described below.

In this case, the voice data related to the emergency situation has to be converted into a file form, but it is not necessary that the positional information is converted into voice data. However, a configuration for automatically activating the wireless internet to transmit the wireless data to a server having a specific URL value is additionally required.

Furthermore, the intelligent emergency signal transmission system using the mobile phone according to the first embodiment of the present invention further comprises the emergency signal management server ESMS for transmitting information of the user and the emergency situation alert signal to the national police agency server PS, a security company server SS, or mobile phones B1-Bn having pre-registered telephone numbers through the data communication network, once receiving the emergency situation alert signal from the mobile phone A1 of the user, in the state in which a plurality of user information and telephone number information which are pre-registered by the corresponding user are stored.

That is, the URL of the emergency signal management server ESMS which is a specific remote server has been pre-registered within the mobile phone A1 of the user included in the intelligent emergency signal transmission system using the mobile phone according to the first embodiment of the present invention. Therefore, at the time of generation of the emergency signal, the signal indicating the emergency situation and the positional information data of the user is set to be automatically transmitted to the emergency signal management server ESMS.

To this end, the mobile phone A1 of the user is configured to be able to automatically activate the wireless internet network to transmit the emergency situation alert signal to the emergency signal management server ESMS.

Meanwhile, the emergency signal management server ESMS also stores picture information of the subscribers. Therefore, the mobilization personnel or the third party called to the scene in order to help the user can rapidly recognize the user by transmitting picture information of the user together with the emergency signal at the time of transmitting the emergency signal to the national police agency server PS, security company server SS, or mobile phones B1-Bn of the third parties.

Figure 2:
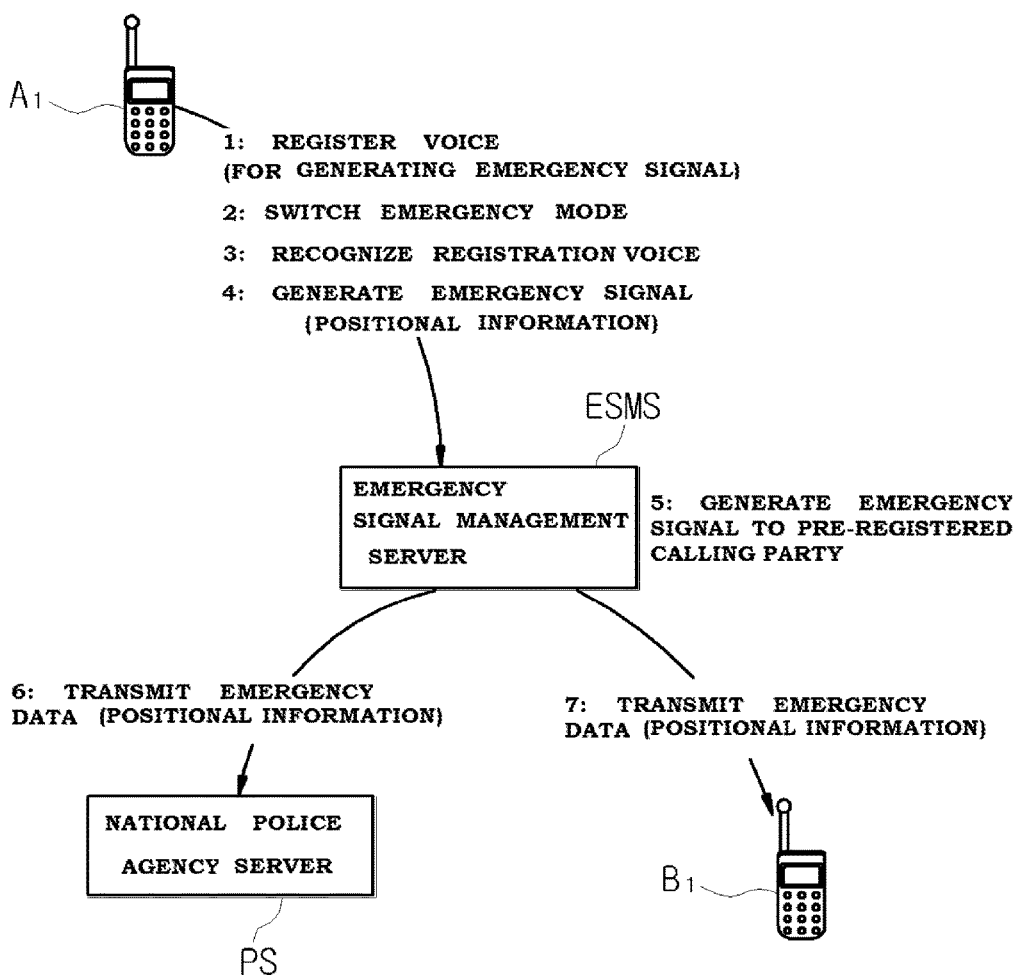
FIG. 2 is a flowchart schematically showing a data flow of the intelligent emergency signal transmission system using the mobile phone according to the first embodiment of the present invention.

FIG. 2 is a flowchart schematically showing a data flow of the intelligent emergency signal transmission system using the mobile phone according to the first embodiment of the present invention.

Referring to drawing, FIG. 2 will also separately describe the data flow for transmitting the emergency signal to the voice communication network through the intelligent emergency signal transmission system using the mobile phone according to the first embodiment of the present invention and the data flow for transmitting the emergency signal through the data communication network.

Firstly, describing the data flow for transmitting the emergency situation alert signal only using the voice communication network, the user registers the specific voice data such as "spare me, please" or "why are you doing this?" as the voice data for generating the emergency situation through a mobile phone A10 of the user.

In addition, the telephone numbers of the called party terminals, that is, the mobile phones B1-Bn having the pre-registered telephone numbers are registered as a target of the call connection.

In this state, when the specific voice data such as "spare me, please" or "why are you doing this?" is input, the mobile phone A1 of the user determines whether an emergency situation has occurred by comparing the corresponding voice data input through the voice recognition with the pre-registered voice data.

When the mobile phone of the user determines that an emergency situation has occurred, the mobile phone of the user records the voice data of the scene for a certain time to create an emergency voice signal, and combines the current position data and the matched voice signal (for example, the generation position of the emergency signal is adjacent to Gangnam Station's Exit 2) to create the emergency situation alert signal.

Next, the call connection to the pre-registered landline telephone or the mobile phones B1-Bn is attempted. When the call connection is performed, the emergency situation alert signal is transmitted to the connected telephone, thereby making it possible for the third party to recognize the emergency situation of the user.

Here, the mobile phone A1 of the user performs the call connection to the mobile phones B1-Bn having pre-registered telephone numbers. However, when the call connection is not performed, the call connection with another telephone number registered in the following order is attempted. Thereafter, when the call connection is performed, the emergency situation alert signal is transmitted to the connected telephone.

Meanwhile, in describing the data flow for transmitting the emergency situation alert signal through the data communication network, the URL of the emergency signal management server ESMS which is a specific remote server has been pre-registered within the mobile phone A1 of the user, and at the time of generation of the emergency signal, the emergency situation signal is automatically generated from the remote emergency signal management server ESMS.

When the mobile phone A1 of the user is always set to an emergency signal decision mode, a battery may be excessively consumed. In addition, in consideration of the fact that dangerous situations generally occur at night, it is preferable for the user set the mobile phone to a normal mode at ordinary times and to pre-set the mobile phone to an emergency signal decision mode at the time of leaving the office or moving around at night. This is similar to the scheme for transmitting the emergency situation alert signal through the voice communication network in which the configuration of a server is not required.

Therefore, in the state in which the user has registered the voice data for generating the emergency situation signal with the mobile phone A1, when the mobile phone A1 is switched to the emergency signal decision mode, the microphone of the mobile phone A1 is activated from this point of time to receive the voice data.

When the voice data is input, the mobile phone A1 drives the voice recognition software embedded therein to compare the pre-registered voice data for generating the emergency situation signal with the input voice data to determine whether both voice data are matched. When both the voice data are matched, the mobile phone A1 determines the current position using the GPS scheme and combines the current position with the emergency situation occurrence signal to configure a data packet.

In addition, the mobile phone A1 automatically activates the wireless internet network to transmit the emergency situation occurrence signal and the positional information to the emergency signal management server ESMS of the pre-registered URL.

Then, the emergency signal management server ESMS receives the emergency situation occurrence signal and the positional information from the mobile phone A1 of the user and transmits information of the corresponding user, the emergency situation occurrence signal and the positional information to the national police agency server PS or the security company server SS through the data communication network, thereby making it possible to go to the scene. In addition, the emergency signal management server ESMS transmits information of the corresponding user, the emergency situation occurrence signal and the positional information to the mobile phones B1-Bn having specific telephone numbers pre-registered by the user, thereby making it possible to inform in real time that the corresponding user is in a dangerous situation.

Here, the mobile phone A1 of the user performs the call connection to the mobile phones B1-Bn having pre-registered telephone numbers. However, when the call connection is not performed, the call connection with another telephone number registered in the following order is attempted. Thereafter, when the call connection is performed, the emergency situation alert signal is transmitted to the connected telephone.

Figure 3:
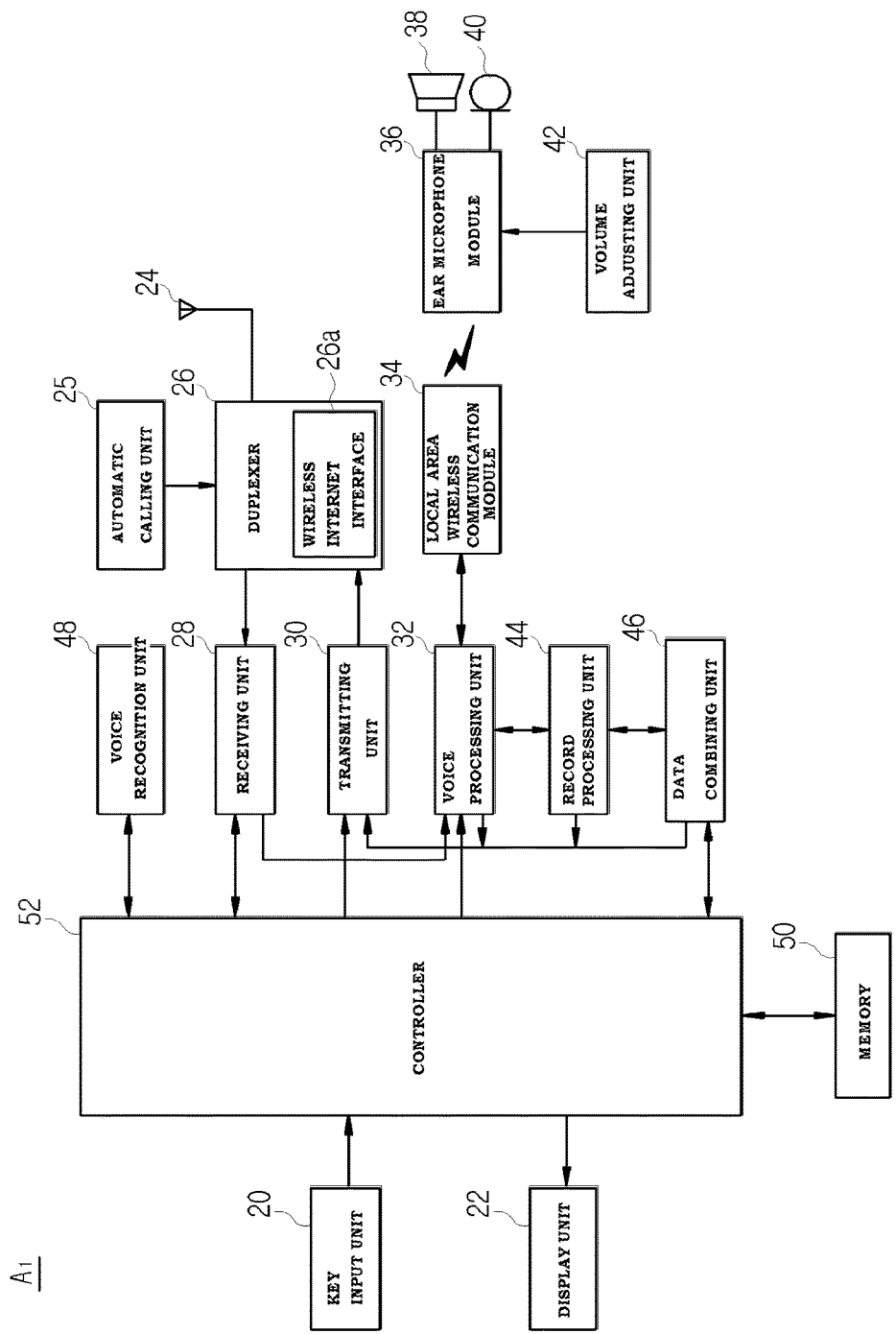
FIG. 3 is a block diagram showing a configuration of the mobile phone included in the intelligent emergency signal transmission system using the mobile phone according to the first embodiment of the present invention.

FIG. 3 is a block diagram showing a configuration of the mobile phone included in the intelligent emergency signal transmission system using the mobile phone according to the first embodiment of the present invention.

Referring to FIG. 3, the configuration of the mobile phone A1 of the user included in the intelligent emergency signal transmission system using the mobile phone according to the first embodiment of the present invention may be applied to both the scheme for transmitting the emergency signal through the voice communication network and the scheme for transmitting the emergency signal through the data communication network. Therefore, in describing the configuration, even though there are some unnecessary configurations, all configurations will be described.

The mobile phone A1 of the user included in the intelligent emergency signal transmission system using the mobile phone according to the first embodiment of the present invention includes a key input unit 20, a display unit 22, an antenna 24, an automatic calling unit 25, a duplexer 26, a receiving unit 28, a transmitting unit 30, a voice processing unit 32, a local area wireless communication module 34, an ear microphone module 36, a speaker 38, a microphone 40, a volume adjusting unit 42, a recording processing unit 44, a data combining unit 46, a voice recognition unit 48, a memory 50 and a controller 52.

In FIG. 3, the key input unit 20 is a means for generating a called party telephone registration and a voice input mode selection signal according to a selection operation of the user. To this end, the key input unit 20 separately includes in a menu key thereof a function key button for generating a key signal for inputting specific sentences or words as voice data in order to generate the emergency situation signal and making code information depending on the input key signal to automatically generate a security signal through the voice recognition.

The key input unit 20 combines the emergency situation occurrence signal and the positional information by a registration key button (not shown) used together with a # key button and transmits the combination to the URL of a specific server. To this end, a button for registering the corresponding URL and inputting and registering the voice of the user and a key button for selecting the emergency situation decision mode is included in the key input unit.

The display unit 22 displays the URL registration state of a specific server, the input and registration state of a specific voice, and the selection state of a security mode according to the operation state of the key input unit 20 to the user in real time. To this end, the display unit 22 includes a thin display means such as a liquid crystal display device, for example, for visually displaying various messages.

In FIG. 3, the duplexer 26 performs wireless communication with the base station of the mobile communication network through the antenna 24 and divides the transmitted and/or received signals, and a separate wireless internet interface 26a is embedded therein. The wireless internet interface 26a is a means connecting to wireless internet server (for example, WAP server) of the preset URL through the wireless internet network in software as a demon for connecting the wireless internet.

The automatic calling unit 25 is a means for attempting the call connection to the pre-registered telephone number and performing the automatic calling in the registered order according to whether the call connection is performed.

The receiving unit 28 receives the voice signal or text information from a mobile phone or a landline telephone terminal of another party, or a mobile switching center (not shown) through the antenna 24 and the duplexer 26. The transmitting unit 30 filters and amplifies the voice signal input from the microphone 40 and transmits the filtered and amplified voice signal to the duplexer 26.

In addition, the voice processing unit 32 processes the voice signal from the another party received through the receiving unit 28 to output the processed voice signal through the speaker 38, and processes the voice signal of the user input through the microphone 40 to output the processed voice signal to the transmitting unit 30.

The voice recognition unit 48 is a means for determining whether the pre-registered voice and the input voice are matched by comparing and determining the specific words and sentences and the input voice using viterbi search or distance analysis of other phonological vectors in the state in which the voice recognition software is loaded.

The recording processing unit 44 is a recording processing means for transmitting the voice signal of surroundings where the emergency situation has occurred in the case the emergency situation alert signal is transmitted through the voice communication network.

The data combining unit 46 is a means for combining the emergency situation signal pre-registered in the memory 50 and the positional information into a single data packet once the control signal of the controller 52 indicating the emergency situation occurs. The data combining unit 46 is connected to the transmitting unit 30, and is thereby capable of automatically transmitting the combined data packet to the pre-registered URL through the wireless data interface 26a. In addition, in the case that the emergency situation alert signal is transmitted through the voice communication network, the data combining unit 46 combines a signal which converts the positional information into the voice signal and the emergency voice signal.

Meanwhile, the memory 50 is a means for registering and storing the voice data which is a factor to recognize the emergency situation, storing data indicating the emergency situation, updating and storing in real time the current positional information of the terminal through a GPS search unit (not shown) embedded in the terminal, and storing telephone numbers of a plurality of mobile phones in order to attempt sequential call connection.

The controller 52 is a means for controlling the mobile phone to store the specific voice data automatically generating the emergency situation of the user by the key operation of the key input unit 20 in the memory, compare the voice data received in real time by driving the microphone with the emergency situation voice data pre-registered from the voice recognition unit 48 to determine whether the emergency situation has occurred, and automatically transmit the emergency situation alert signal according to the order of the pre-registered telephone numbers to transmit the emergency situation alert signal at the time of occurrence of the emergency situation.

Here, the microphone 40 and the speaker 38 are included in the ear microphone module 36 in which the local area wireless communication module (not shown) is embedded, and the mobile phone A1 of the user further comprises another local area wireless communication module 34 for communicating with the local area wireless communication module (not shown) embedded in the ear microphone module 36.

Meanwhile, the ear microphone module 36 further comprises the volume adjusting unit 42 for auto-adjusting the volume of the speaker 38 and microphone 40 to a preset value according to whether the emergency situation has occurred.

FIG. 4 is a block diagram showing a configuration of an emergency signal management server included in the intelligent emergency signal transmission system using the mobile phone according to the first embodiment of the present invention.

Referring to FIG. 4, the emergency signal management server ESMS included in the mobile phone A1 of the user included in the intelligent emergency signal transmission system using the mobile phone according to the first embodiment of the present invention includes a communication module 54, a subscriber information registration unit 56, a subscriber data processing unit 58, an emergency signal generating unit 60, an accident occurrence position management unit 62, an automatic calling processing unit 64, a subscriber information database (DB) 66a, a subscriber emergency signal DB 66b, a national police agency and security company registration DB 66c, an additional calling telephone number DB 66d, subscriber positional information DB 66e, mobilization information DB 66f, and a controller 68.

More particularly, the communication module 54 is a means for receiving and processing a service subscription signal, an emergency situation occurrence signal, and a position signal from the mobile phone A1 of the user through the wireless data communication network via WAP server (not shown).

In addition, the subscriber information registration unit 56 is a means for receiving the service subscription signal from the mobile phone A1 of the user to register personal information and telephone number information of the corresponding subscriber. The subscriber data processing unit 58 is a means for receiving the emergency situation occurrence signal and the position signal transmitted from the mobile phone A1 of the user to classify and process the signals for each data.

In addition, the emergency signal generation unit 60 is a means for receiving the emergency situation occurrence signal of the subscriber connecting through the subscriber information registration unit 56 to confirm and manage the subscriber. The accident occurrence position management unit 62 is a managing means to transmit the positional information in which the emergency situation occurrence signal of the subscriber has occurred to the national police agency server and the security company server by connecting to the subscriber data processing unit 58.

The automatic calling processing unit 64 is a means for sequentially performing the automatic calling processing to the telephone number which is pre-registered with the mobile phone A1 of the user in order to transmit the emergency situation alert signal. That is, a call connection to any one of telephone numbers is performed for a certain time, and when the call connection is not performed, a call connection signal to the following order telephone number is automatically generated.

The subscriber information DB 66a is a database for storing the personal information and telephone number of the corresponding subscriber, and the subscriber emergency DB 66b is a database for storing the information of the subscriber generating the emergency situation. The national police agency and security company registration DB 66c is a DB in which the national police agency and the security company information and URL information of the servers thereof are stored.

The additional calling telephone number DB 66d is a database for storing a target telephone number in which the automatic calling processing is performed, and storing information on whether the call connection is executed.

In addition, the subscriber positional information DB 66e is a database for storing emergency situation occurrence position data, and the mobilization information DB 66f is a database for storing mobilization information of the national police agency and the security company at the time of informing the emergency situation of the subscriber.

Meanwhile, the controller 68 is a means for controlling the emergency signal management server ESMS to receive the emergency situation occurrence signal and the positional information from the mobile phone A1 of the user to store the corresponding information and transmit the information of the corresponding user, the emergency situation occurrence signal, and the positional information to the national police agency server PS, the security company server SS, or the mobile phones B1-Bn having a pre-registered telephone number through the data communication network.

Functions and operations of the intelligent emergency signal transmission system using a mobile phone according to the first embodiment of the present invention having the above described configurations will be described in detail with reference to accompanying drawings.

Figure 5B:
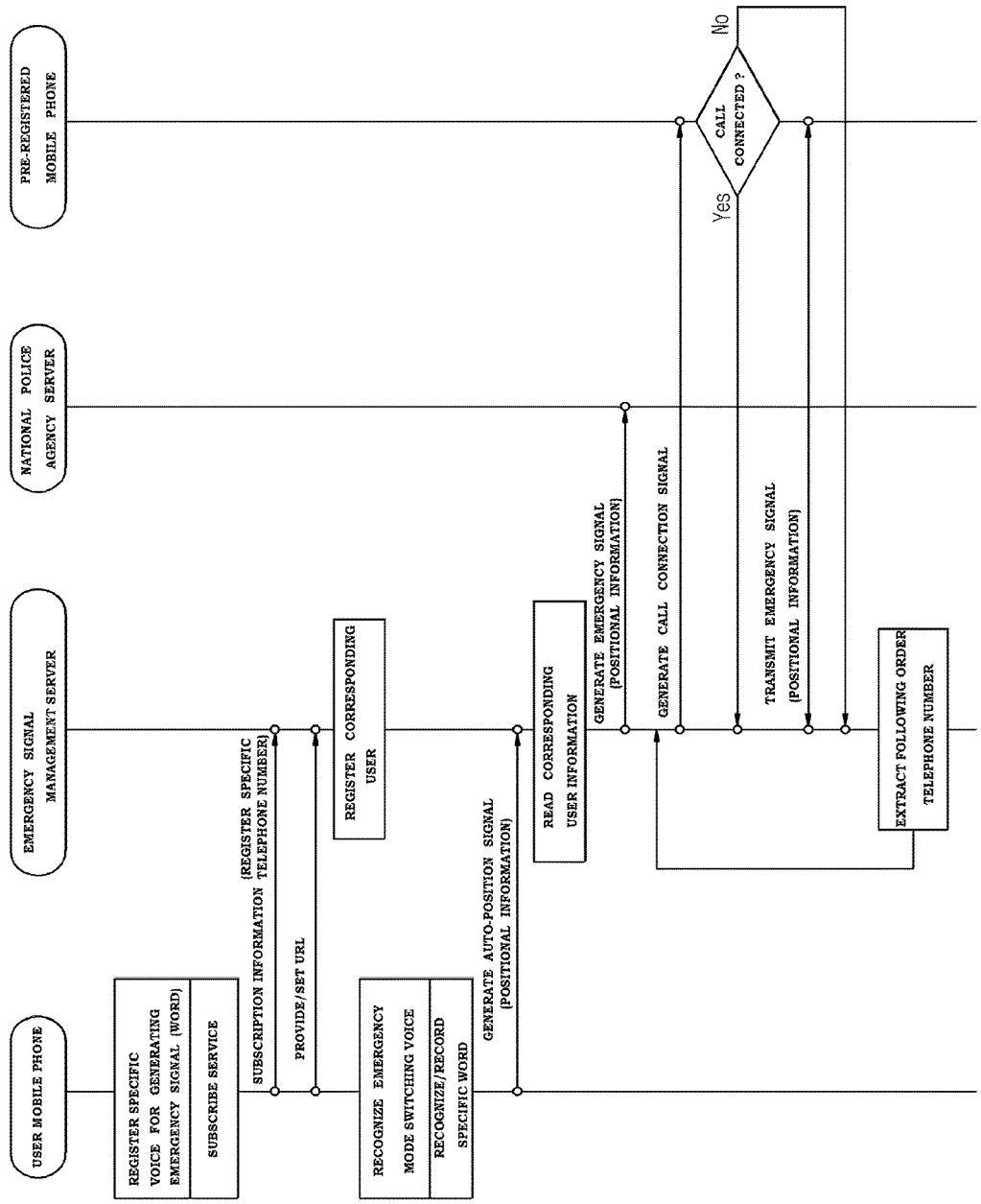

FIGS. 5A, 5B and 5C are flowcharts showing a signal flow of the intelligent emergency signal transmission system using the mobile phone according to the first embodiment of the present invention.

Firstly, FIG. 5A is a view showing the operation in which the mobile phone A1 of the user directly transmits the emergency situation alert signal to the mobile phone B1-Bn having a pre-registered telephone number through the voice communication network at the time in which the emergency situation has occurred. The user registers the specific voice data such as "spare me, please" or "why are you doing this?" as the voice data for generating the emergency situation through the mobile phone A10 of the user.

In addition, the telephone numbers of the called party terminals, that is, the mobile phones B1-Bn having the pre-registered telephone numbers are registered as a target of the call connection.

Next, when the user switches the mobile phone A1 to the emergency situation decision mode, the microphone is activated to enter a standby state in which voice data is received. In this state, when the specific voice data such as "spare me, please" or "why are you doing this?" is input, the mobile phone A1 of the user determines whether an emergency situation has occurred by comparing the corresponding voice data input through the voice recognition with the pre-registered voice data.

When the mobile phone of the user determines that an emergency situation has occurred, the mobile phone of the user records the voice data of the scene for a certain time to create an emergency voice signal, and combines the current position data and the matched voice signal (for example, the generation position of the emergency signal is adjacent to Gangnam Station's Exit 2) to create the emergency situation alert signal.

Next, the call connection to the pre-registered landline telephone or the mobile phones B1-Bn is automatically attempted by the mobile phone A1 of the user.

When the call connection is performed to the pre-registered telephone number of the mobile phone (for example, B1), the emergency situation alert signal is transmitted to the connected telephone, thereby making it possible for the third party to recognize the emergency situation of the user.

Here, the mobile phone A1 of the user performs the call connection to the mobile phones B1-Bn having pre-registered telephone numbers. However, when the call connection is not performed, the call connection with another telephone number registered in the following order is attempted. Thereafter, when the call connection is performed, the emergency situation alert signal is transmitted to the connected telephone.

FIG. 5B is a flowchart showing the operation in which the mobile phone A1 of the user generates the emergency situation occurrence signal through the data communication network, particularly, wireless data communication network, and the emergency signal management server ESMS relays the emergency situation occurrence signal so that an alert signal of the emergency situation occurrence is transmitted to a specific server or a mobile phone B1-Bn having a specific telephone number.

The URL of the emergency signal management server ESMS which is a specific remote server is pre-registered within the mobile phone A1 of the user, and when the emergency signal is generated, the emergency situation signal is automatically transmitted to the remote emergency signal management server ESMS.

When the mobile phone A1 of the user is always set to an emergency signal decision mode, a battery may be excessively consumed. In addition, in consideration of the fact that dangerous situations generally occur at night, it is preferable for the user set the mobile phone to a normal mode at ordinary times and to pre-set the mobile phone to an emergency signal decision mode at the time of leaving the office or moving around at night. This is similar to the scheme for transmitting the emergency situation alert signal through the voice communication network in which the configuration of a server is not required.

Therefore, in the state in which the user has registered the voice data for generating the emergency situation signal with the mobile phone A1, when the mobile phone A1 is switched to the emergency signal decision mode, the microphone of the mobile phone A1 is activated from this point of time to receive the voice data.

When the voice data is input, the mobile phone A1 drives the voice recognition software embedded therein to compare the pre-registered voice data for generating the emergency situation signal with the input voice data to determine whether both voice data are matched. When both the voice data are matched, the mobile phone A1 determines the current position using the GPS scheme and combines the current position with the emergency situation occurrence signal to configure a data packet.

In addition, the mobile phone A1 automatically activates the wireless internet network to transmit the emergency situation occurrence signal and the positional information to the emergency signal management server ESMS of the pre-registered URL.

Then, the emergency signal management server ESMS receives the emergency situation occurrence signal and the positional information from the mobile phone A1 of the user and transmits information of the corresponding user, the emergency situation occurrence signal and the positional information to the national police agency server PS or the security company server SS through the data communication network, thereby making it possible to go to the scene. In addition, the emergency signal management server ESMS transmits information of the corresponding user, the emergency situation occurrence signal and the positional information to the mobile phones B1-Bn having specific telephone numbers pre-registered by the user, thereby making it possible to inform in real time that the corresponding user is in a dangerous situation.

Here, the emergency signal management server ESMS has performed the call connection to the mobile phones B1-Bn having pre-registered telephone numbers. However, when no answer state in which the call connection is not performed is generated, the call connection to another telephone number registered in the following order is attempted. Thereafter, when the call connection has been performed, the emergency situation alert signal is transmitted.

FIG. 5C is a flowchart describing a volume auto-adjust function mounted in the mobile phone A1 of the user. The intelligent emergency signal transmission system using the mobile phone according to the first embodiment of the present invention is a system in which the mobile phone A1 of the user automatically informs that the emergency situation has occurred at the time of the occurrence of the emergency situation even though the user does not take a particular action.

Therefore, the robbers, intimidators, or the kidnappers do not recognize that the user who is under the threat or the emergency situation has informed the third party of the emergency signal through the mobile phone A1.

In addition, in the state in which the call connection between the mobile phone A1 of the user and the mobile phones B1-Bn having pre-registered telephone numbers is performed through the voice communication network, when the voice signal of the third party is output from the speaker of the mobile phone A1 of the user, the robbers, the intimidators, or the kidnappers may recognize that the call has been connected. Therefore, a countermeasure against above problem is required.

To this end, when the emergency signal is generated and the microphone is activated, the inventive mobile phone A1 of the user auto-adjusts the volume of the microphone to the maximum level so as to input the voice signal sufficiently.

In addition, when the emergency signal is generated and the call connection to the mobile phones B1-Bn of the third party is performed, the inventive mobile phone A1 of the user auto-adjusts the volume of the speaker to the minimum level so that the voice signal of the third party is not output from the speaker of the mobile phone A1 of the user.

In addition, the mobile phone A1 of the user determines whether the emergency situation is over so as to return the previous set volume of the microphone and speaker when the emergency situation is over.

Hereinafter, an intelligent emergency signal transmission system using a mobile phone according to a second embodiment of the present invention will be described in detail with reference to drawings.

Figure 6:
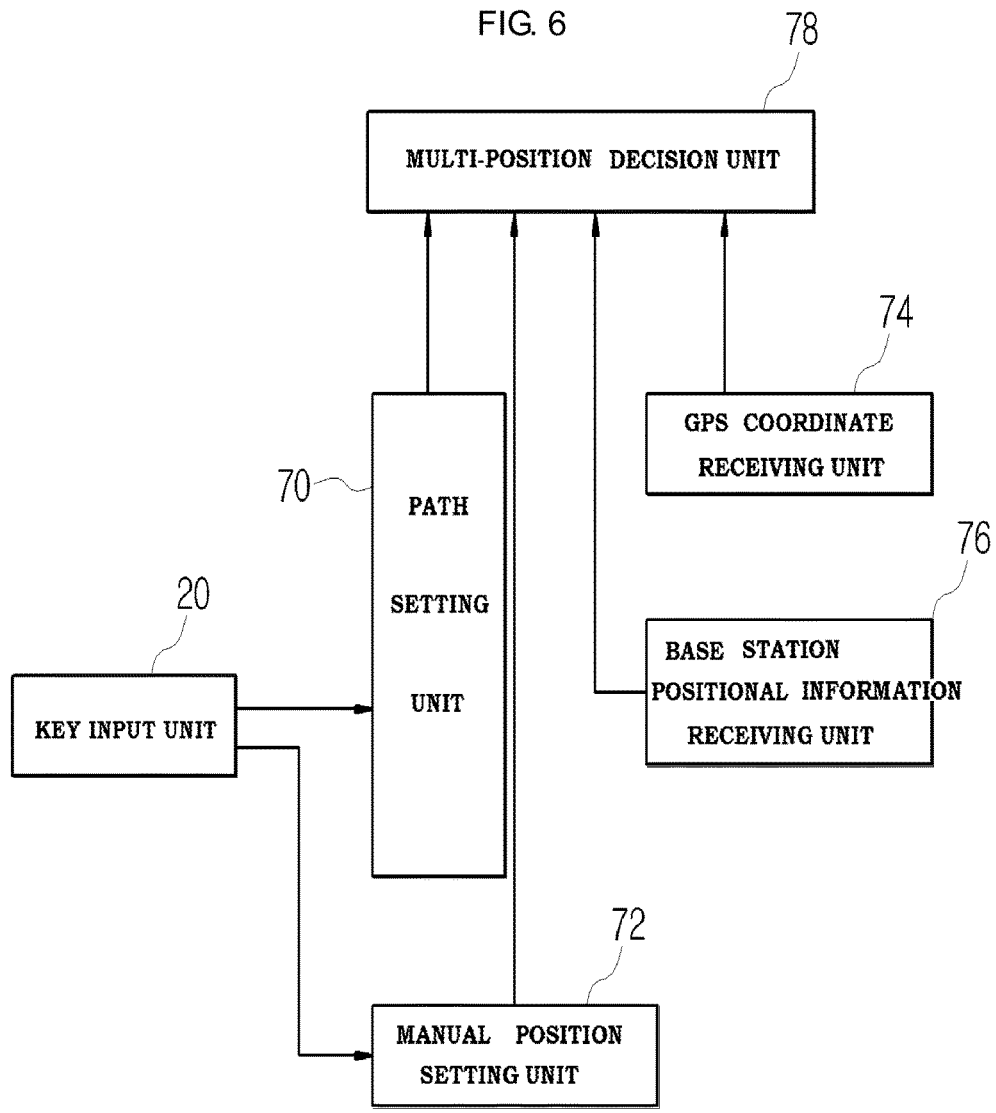
FIG. 6 is a view showing a configuration for determining multiple positions of the intelligent emergency signal transmission system using the mobile phone according to a second embodiment of the present invention.
Figure 7:
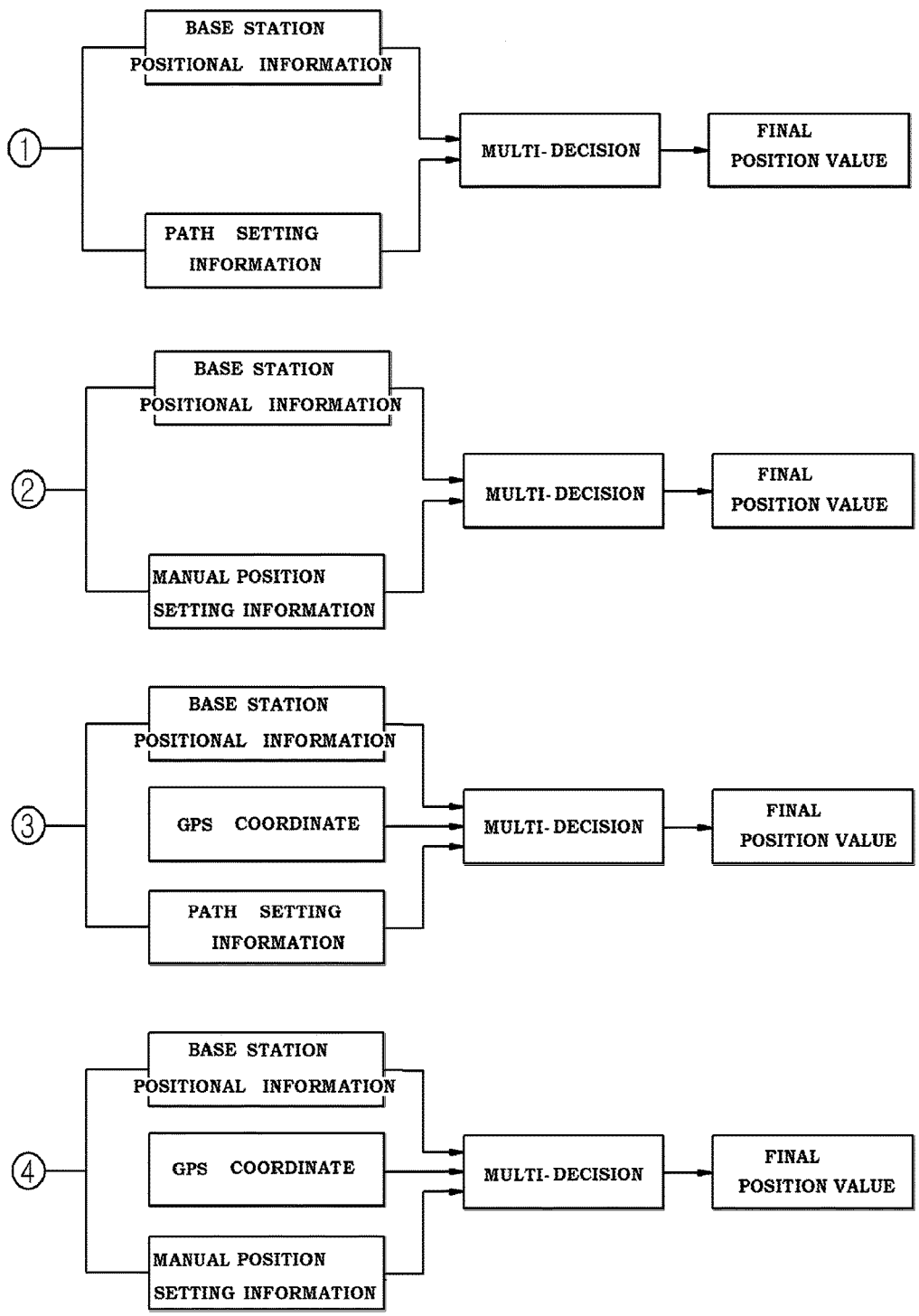
FIG. 7 is a view showing a multiple positions decision state of the intelligent emergency signal transmission system using a mobile phone according to the second embodiment of the present invention.

FIG. 6 is a view showing a configuration for determining multiple positions of the intelligent emergency signal transmission system using the mobile phone according to a second embodiment of the present invention, and FIG. 7 is a view showing a multiple positions decision state of the intelligent emergency signal transmission system using a mobile phone according to the second embodiment of the present invention.

Referring to the drawings, the intelligent emergency signal transmission system using a mobile phone according to the second embodiment of the present invention is a system capable of extracting accurate positional information by synthetically utilizing coordinate values of GPS satellites, position of base stations, moving path information designated by a user, and current positional information designated by the user to overcome each defect of the above elements in determining the position of the mobile phone capable of automatically transmitting the emergency signal, and a method thereof.

Typically, a scheme extracting the positional information on the mobile phone A1 of the user is divided into a GPS scheme and a calculation scheme using the base station. Recently, iPhones or Google Phones basically use the positional information calculation scheme of the GPS scheme, but in the case of the GPS scheme, since the position value may not be received from the satellite in the inside of a building, tunnel or the like, the position decision may be impossible. In addition, the positional information calculation scheme based on base stations may determine the position even in the inside of a building or tunnel, but since only an approximate value of the position where the mobile phone is positioned within a propagation region of any base station may be calculated, a precise position decision may be impossible.

Therefore, the intelligent emergency signal transmission system using a mobile phone according to the second embodiment of the present invention includes a function determining the position where the emergency situation has occurred synthetically using at least two positional information calculation schemes among the positional information calculation scheme based on base stations, the GPS position calculation scheme, the positional information calculation scheme using the moving path registration, or the positional information calculation scheme using the current position registration in order to determine the scene position having a high precision and low error rate in which the emergency situation has occurred.

Since the positional information calculation scheme based on the base station or the GPS position calculation scheme are already known technologies, a detailed description thereof will be omitted. Firstly, the positional information calculation scheme based on the path registration will be described.

The positional information calculation scheme based on the path registration is a scheme calculating the position by registering the moving path with the mobile phone A1 of the user in advance by the user and further adding any one of the positional information calculation schemes using the base station and the GPS position calculation scheme.

For example, the user registers the moving path using the mobile phone A1 of the user in advance as "00 school-00 institute-the No. 2 subway line Gangnam station-via the No. 2 subway line Sadang station-the No. 4 subway line Beomgye station-00 apartment". In this state, when the position is determined in real time together with the GPS position calculation scheme, if the user is on board the subway, the GPS signal may not be received. However, a user's position over moving path may be determined when the emergency signal has occurred along the path designated in advance by the user.

In addition, in the case of all place names in which the path is designated, address information is registered with all place names so that when the emergency signal has been generated, it is possible to go to the corresponding address.

If the position where the emergency signal has been generated is calculated synthetically using the positional information calculation scheme based on the path registration and the positional information calculation scheme based on base stations, in the state that the user registers the moving path in the mobile phone A1 using the mobile phone A1 of the user, the positional information of the base station in which the mobile phone A1 of the user is positioned is received from a mobile communication server (not shown), and it is thereby possible to determine where the mobile phone is positioned within the all registered moving paths. As a result, the position of the mobile phone A1 of the user may be more precisely calculated than the position calculation simply using the position of the base station.

In addition, when the user will stay in one-room, or an apartment, institute or the like for long time without moving, the precise position may be similarly calculated by manually registering the corresponding position in the mobile phone A1 of the user and additionally combining the GPS position calculation scheme or the positional information calculation scheme using the base station.

For this end, the mobile phone A1 of the user included in the intelligent emergency signal transmission system using a mobile phone according to the second embodiment of the present invention is provided with a path setting unit 70 for managing information of the moving path registered through the key input unit 20, and is provided with a manual position setting unit 72 for setting a current position when the mobile phone is not moved from the current position for long time.

In addition, the mobile phone A1 of the user included in the intelligent emergency signal transmission system using a mobile phone according to the second embodiment of the present invention is provided with a known GPS coordinate receiving unit 74 for receiving the coordinate values from the GPS satellites and a base station positional information receiving unit 76 for receiving the positional information of the base station from the mobile communication server (not shown).

Hereinafter, an intelligent emergency signal transmission system using a mobile phone according to a third embodiment of the present invention will be described in detail with reference to drawing.

Figure 8:
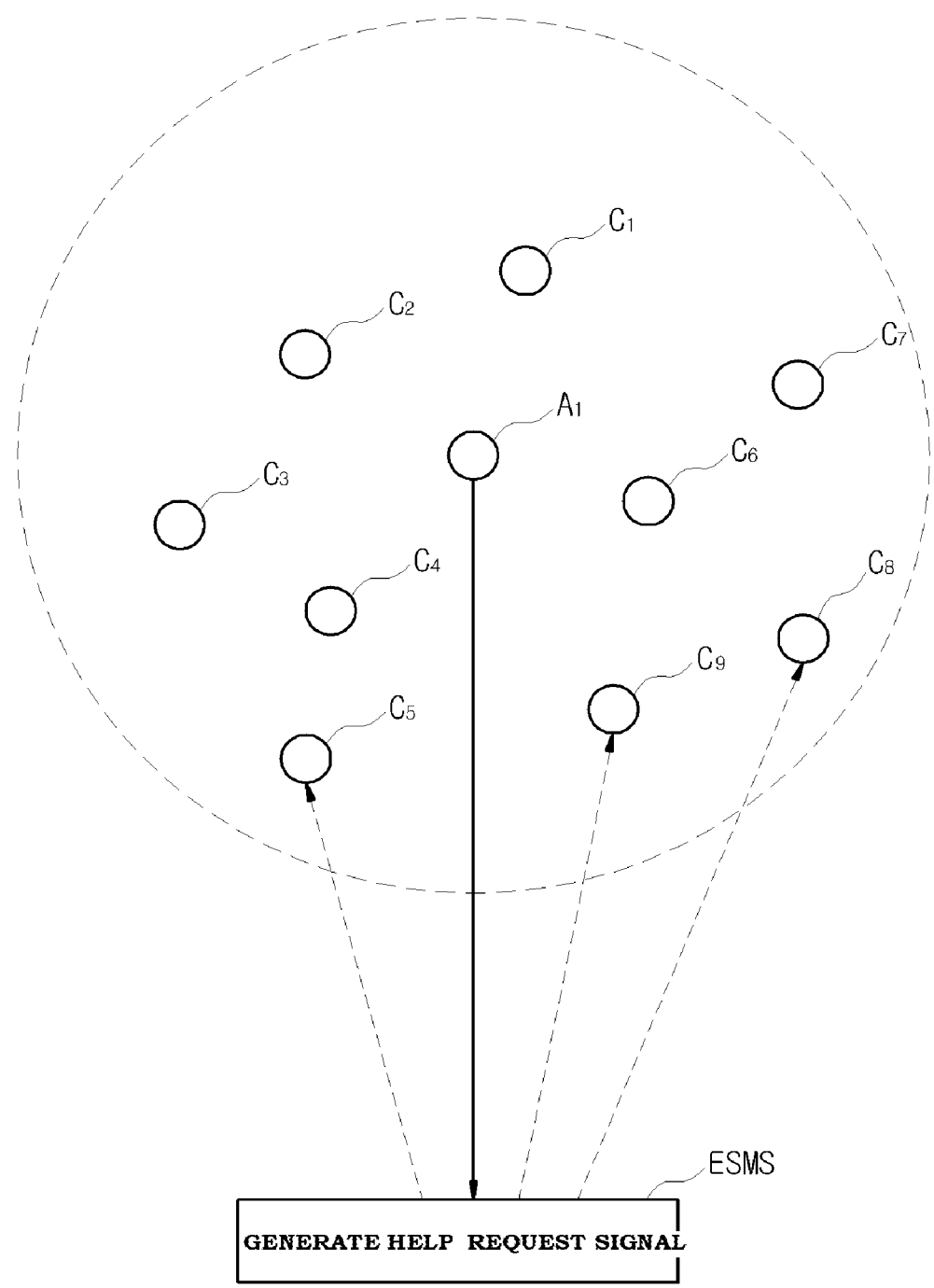
FIG. 8 is a view showing a state in which the emergency signal is transmitted to a nearby mobile phone through the intelligent emergency signal transmission system using a mobile phone according to a third embodiment of the present invention.

FIG. 8 is a view showing a state in which the emergency signal is transmitted to a nearby mobile phone through the intelligent emergency signal transmission system using a mobile phone according to a third embodiment of the present invention.

Referring to FIG. 8, in the intelligent emergency signal transmission system using a mobile phone according to the third embodiment of the present invention, the positional information of the emergency signal generation and a help requesting signal are transmitted to the mobile phone of the third party positioned within a certain radius based on the position of the mobile phone in which the emergency signal has generated, and thereby making it is possible for the surrounding person to rapidly give the help to the user in the emergency situation.

That is, the mobile phone A1 of the user included in the intelligent emergency signal transmission system using a mobile phone according to the third embodiment of the present invention requests the mobilization by automatically transmitting the emergency signal to the national police agency or the security company, but some time is consumed in mobilizing in the case of a kidnapping or robbery. Therefore, the user may be exposed to dangerous situations due to a delayed countermeasure.

Therefore, the intelligent emergency signal transmission system using a mobile phone according to the third embodiment of the present invention further comprises a function for requesting help from a third party resided in a position near the position where the mobile phone A1 of the user is positioned.

To this end, the intelligent emergency signal transmission system using a mobile phone according to the third embodiment of the present invention includes an emergency signal management server ESMS for receiving a position signal from the mobile phone A1 of the user in which the emergency signal has been generated to transmit the position signal to a mobile communication server (not shown), and extracting a telephone number of the mobile phones B1-Bn of the third party included in the propagation region of the base station corresponding to the position of the mobile phone A1 of the corresponding user from the mobile communication server to transmit the emergency signal and picture information of the corresponding user to the mobile phone B1-Bn of the corresponding third party.

That is, as shown in FIG. 8, when the emergency signal management server ESMS receives the emergency signal and the position signal from the mobile phone A1 of a specific user, the ESMS transmits the emergency signal and picture information of the corresponding user to the mobile phones (for example, C1-C9) of a third party positioned near the corresponding mobile phone A1, and thereby being capable of giving help to the user.

To this end, the intelligent emergency signal transmission system using a mobile according to the third embodiment of the present invention includes: a mobile phone of a user for loading voice recognition software determining whether an emergency situation has occurred through a voice recognition for a preset specific voice data, and sequentially attempting a call connection to a plurality of telephone numbers which are pre-registered through a voice communication network when it is determined that the emergency situation has occurred, and transmitting data containing an emergency situation alert signal when the call connection is performed; an emergency signal management server for receiving the emergency situation alert signal from the mobile phone of the user to transmit a telephone number of the mobile phone of the user to a mobile communication server through a data communication network in the state that a plurality of user information and telephone information pre-registered by corresponding user are registered, and receiving telephone number information of a plurality of mobile phones positioned in a base station region in which the mobile phone of the user is included from the mobile communication server to transmit information of the user in the emergency situation and the emergency situation alert signal; and a mobile communication server for receiving information of the mobile phone of the user in which the emergency situation signal is generated from the emergency signal management server, and searching for the telephone numbers of the plurality of mobile phones positioned within a certain radius centered around the mobile phone of the user to transmit the searched telephone number to the emergency signal management server. Preferably, the plurality of mobile phones have the pre-registered telephone numbers for receiving the emergency situation alert signal from the mobile phone of the user.

Functions and operations of the intelligent emergency signal transmission system using a mobile phone according to the third embodiment of the present invention having the above described configurations will be described in detail with reference to accompanying drawing.

Figure 9:
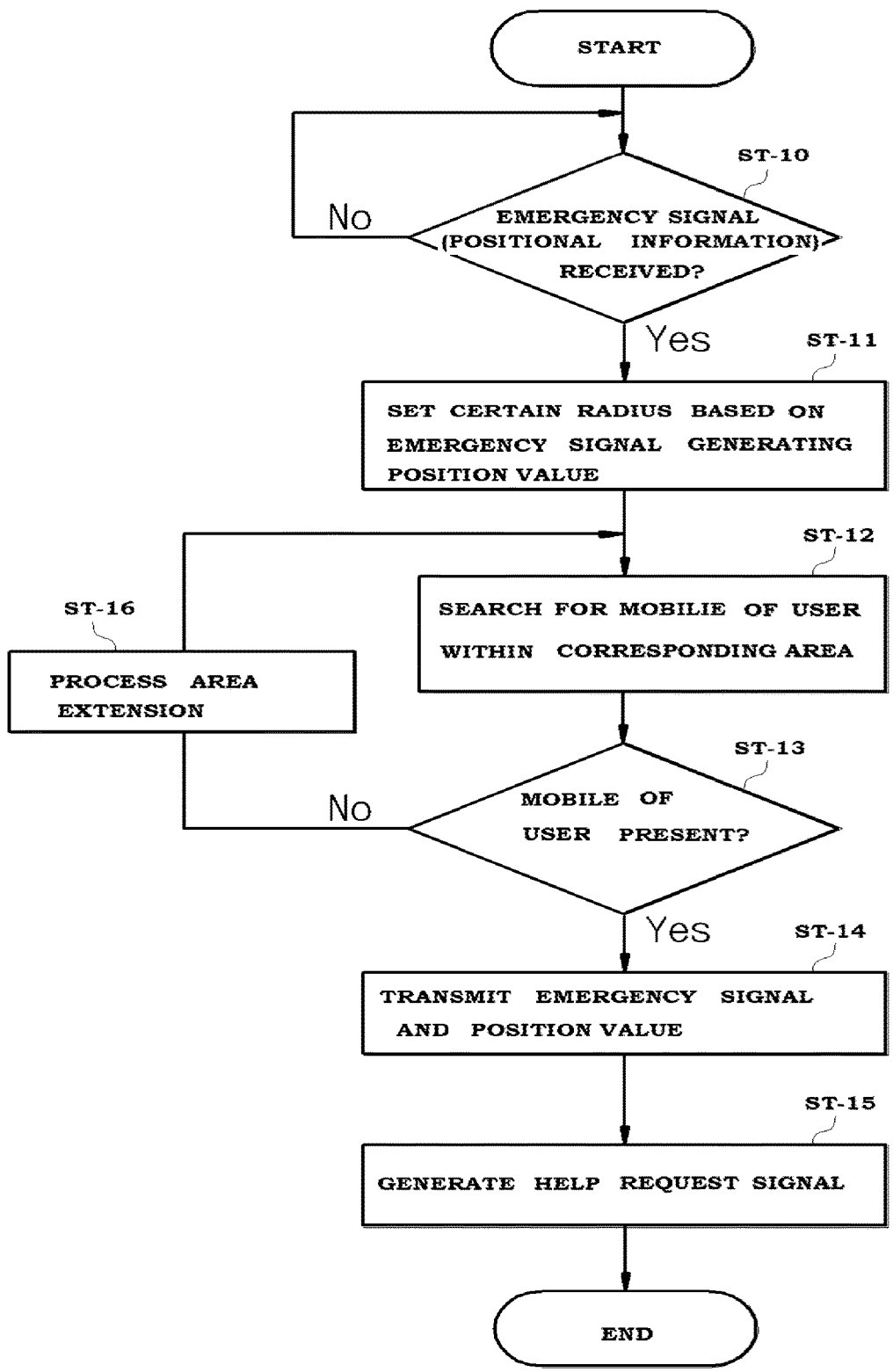
FIG. 9 is a flowchart showing a signal flow of the intelligent emergency signal transmission system using the mobile phone according to the third embodiment of the present invention.

FIG. 9 is a flowchart showing a signal flow of the intelligent emergency signal transmission system using the mobile phone according to the third embodiment of the present invention.

Firstly, the emergency signal management server ESMS included in the intelligent emergency signal transmission system using the mobile phone according to the third embodiment of the present invention receives the emergency signal from the mobile phone A1 of the user.

Thereafter, the emergency signal management server ESMS transmits the positional information of the emergency signal generation or the telephone number information of the mobile phone to the mobile communication server (not shown).

Next, the mobile communication server extracts the telephone numbers of the mobile phones (C1-Cn) within a certain radius based on the position of the corresponding mobile phone A1.

The mobile communication server transmits the telephone numbers of the mobile phones (C1-Cn) positioned nearby to the emergency signal management server ESMS.

Therefore, the emergency signal management server ESMS transmits the positional information in which the emergency situation has occurred, the emergency signal and the help request signal to the telephone numbers of the mobile phones (C1-Cn) positioned nearby.

Here, the mobile communication server searches for a presence and telephone information for the mobile phones (C1-Cn) positioned near the mobile phone A1 of the user through the positional information of the mobile phones (C1-Cn) received from a plurality of base stations.

In addition, the emergency signal and the help request signal in which the emergency signal management server ESMS transmits to the mobile phones (C1-Cn) positioned nearby are a text message or an MMS file including the voice message and picture information.

While the automatic position information transmission system using the wireless data network according to the present invention has been described with reference to the preferred embodiments, it will be understood by those skilled in the related art that various modifications and variations may be made therein without departing from the scope of the present invention as defined by the appended claims.

What is claimed is:

1. An intelligent emergency signal transmission method using a mobile phone, comprising:
   registering specific voice data of a user of the mobile phone;
   registering target telephone numbers for calling in a registered order;
   activating an emergency situation decision mode of the mobile phone;
   receiving, by a microphone of the mobile phone, current surrounding voice data;
   comparing, by the mobile phone, the registered specific voice data with the current surrounding voice data to determine a match;
   automatically adjusting, upon a determination of the match, the microphone of the mobile phone to a maximum microphone level to increase an input of the current surrounding voice data to the mobile phone;
   automatically recording, upon the determination of the match, additional audio information by the mobile phone, the additional audio information comprising the current surrounding voice data received by the mobile phone for a predetermined period of time after the determination of the match;
   converting positional information from the mobile phone into audio positional information;
   creating a combined voice message including: the current surrounding voice data that was matched; the additional audio information; and the audio positional information;
   sequentially calling the target telephone numbers in the registered order to establish a call connection until at least one call results in an answer;
   automatically adjusting a speaker of the mobile phone to a minimum speaker level to minimize an output, through the mobile phone, of sound from the call connection; and
   transmitting the combined voice message.

2. An intelligent emergency signal transmission method using a mobile phone, comprising:
   registering specific voice data of a user of the mobile phone;
   registering target telephone numbers for calling in a registered order;
   activating an emergency situation decision mode of the mobile phone;
   receiving, by a microphone of the mobile phone, current surrounding voice data;
   comparing, by the mobile phone, the registered specific voice data with the current surrounding voice data to determine a match;
   automatically adjusting, upon a determination of the match, the microphone of the mobile phone to a maximum microphone level to increase an input of the current surrounding voice data to the mobile phone;
   automatically recording, upon the determination of the match, additional audio information by the mobile phone, the additional audio information comprising the current surrounding voice data received by the mobile phone for a predetermined period of time after the determination of the match;
   creating a combined data packet including: the current surrounding voice data that was matched; the additional audio information; positional information, and an emergency signal;
   sending the combined data packet over a wireless Internet interface to an emergency signal management server;
   sequentially calling, by the emergency signal management server, the target telephone numbers in the registered order to establish a call connection until at least one call results in an answer; and
   automatically adjusting a speaker of the mobile phone to a minimum speaker level to minimize an output, through the mobile phone, of sound from the call connection.

3. An intelligent emergency signal transmission system, comprising:
   a mobile phone of a user for determining a current position of the mobile phone of the user based on a base station, a pre-GPS (Global Positioning System) coordinate value or a directly registered moving path of the user, and for loading voice recognition software configured for storing a preset specific voice data, receiving surrounding voice data, determining whether an emergency situation has occurred through a voice recognition when the preset specific voice data is matched with the voice data, sequentially attempting a call connection to a plurality of telephone numbers which are pre-registered through a voice communication network when it is determined that the emergency situation has occurred, and transmitting data containing an emergency situation alert signal when the call connection is performed;

a national police agency server or a security company server receiving the emergency situation alert signal from the mobile phone of the user to generate a scene mobilization signal; and a mobile phone having the pre-registered telephone numbers for receiving the emergency situation alert signal and the voice data that was matched from the mobile phone of the user, wherein a local area wireless communication module for communicating with an ear microphone device embedded in the mobile phone of the user, and inside of the ear microphone device is further provided with a volume adjusting unit for auto-adjusting a volume of a speaker to a minimum level and auto-adjusting a volume of a microphone to a maximum level, and wherein the mobile phone of the user automatically adjusts, upon a determination of a match, the microphone of the mobile phone to the maximum level to increase an input of the surrounding voice data to the mobile phone, adjusts the speaker of the mobile phone to the minimum level to minimize an output, through the mobile phone of the user, of sound from the call connection, automatically records, upon the determination of the match, the surrounding voice data for a predetermined period of time after the determination of the match, and creates the emergency situation alert signal using the voice data that was matched and the recorded surrounding voice data.

* * * * *